United States Patent [19]

Oikawa

[11] Patent Number: 5,197,331
[45] Date of Patent: Mar. 30, 1993

[54] OSCILLATORY ANGULAR SPEED DETECTING APPARATUS

[75] Inventor: Takahiro Oikawa, Shizuoka, Japan

[73] Assignee: Yazaki Corporation, Japan

[21] Appl. No.: 850,159

[22] Filed: Mar. 13, 1992

Related U.S. Application Data

[60] Continuation-in-part of Ser. No. 486,414, Feb. 28, 1990, abandoned, which is a continuation-in-part of Ser. No. 372,096, Jun. 28, 1989, abandoned, which is a division of Ser. No. 139,593, Dec. 30, 1987, abandoned.

[51] Int. Cl.⁵ ............................................. G01P 9/04
[52] U.S. Cl. ....................................................... 73/505
[58] Field of Search ........................................... 73/505

[56] References Cited

U.S. PATENT DOCUMENTS

| | | | |
|---|---|---|---|
| 3,520,195 | 7/1970 | Tehon | 73/505 |
| 4,409,836 | 10/1983 | Comroe et al. | 73/505 |

FOREIGN PATENT DOCUMENTS

| | | | |
|---|---|---|---|
| 61-193019 | 8/1986 | Japan | 73/505 |
| 947310 | 1/1964 | United Kingdom . | |
| 1288118 | 9/1972 | United Kingdom . | |
| 2154739 | 9/1985 | United Kingdom . | |

OTHER PUBLICATIONS

"Solid State Angular Rate Sensor (VYRO)", *AIAA Publication 80-1742*, 1980, pp. 183–187.
S. Sugawara et al., "Angular Rate Detection Utilizing Phase Shift in a Piezoelectric Vibratory Gyro," Japan Journal of Applied Physics, vol. No. 26 (1987), suppl 26-2, pp. 171–173.
"Angular Rate Detection by Phase Shift in a Piezoelectric Vibratory Gyro (Principle)" Japan Acoustics Society Transactions, Mar. 1987, pp. 683–684.
"Development of Vibrational Rate Sensor and Navigation System," T. Oikawa et al., in *Recent Developments in Automotive Electronic Displays and Information Systems*, SAE No. S-694, pp. 57–65; Feb. 1987.
W. D. Gates, "Vibrating Angular Rate Sensor may Threaten the Gyroscope," *Electronics*, Jun. 10, 1968, pp. 130–134.

Primary Examiner—John E. Chapman
Attorney, Agent, or Firm—Wigman & Cohen

[57] ABSTRACT

An oscillatory angular speed detecting apparatus is disclosed which includes a pillar-shaped oscillator body and drive and readout piezoelectric transducers attached to first, second, and third surfaces of the oscillator body, the first side surface being perpendicular to the second side surface and the third side surface being parallel to the first side surface, in which vibration of the oscillator body is transduced into a readout signal by the readout transducer. A phase detecting device detects variations of phases of the readout signals, and an amplitude detecting device detects variations of amplitudes of the readout signals, and the angular speed is detected from the phases detected by the phase detecting device and/or the amplitude detected by the amplitude detecting device.

9 Claims, 5 Drawing Sheets

OSCILLATORY ANGULAR SPEED DETECTING APPARATUS

CROSS-REFERENCE TO RELATED APPLICATION

This is a continuation-in-part of co-pending application Ser. No. 07/486,414 filed on Feb. 28, 1990 abandoned, which is a continuation-in-part of application Ser. No. 372,096, abandoned, filed Jun. 28, 1989 which is a divisional of Ser. No. 139,593, filed Dec. 30, 1987, abandoned.

BACKGROUND OF THE INVENTION

Field of the Invention

The present invention relates to an oscillatory angular speed detecting apparatus and, more particularly, to an oscillatory angular speed detecting apparatus, in which a displacement generated by a Coriolis force is transduced into an electric signal, and then an angular speed is detected from the electric signal.

Description of the Background Art

In a conventional oscillatory angular speed detecting apparatus, a conventional detecting element shown in FIG. 1 is used. As shown in FIG. 1, the detecting element comprises a square-piller-shaped beam 1 functioning as an oscillator body, a drive piezoelectric transducer 2a attached to a central portion of a longitudinal surface 1a of the beam 1, and a readout piezoelectric transducer 2b attached to a central portion of another longitudinal surface 1b of the beam 1, the surface 1b being perpendicular to the surface 1a. The beam 1 is supported at fixed linear positions a and b by support members 3a and 3b, respectively. The beam 1 is driven in a sine wave form by applying a drive signal to the drive piezoelectric transducer 2a.

When an angular speed is added to the beam 1 around a central longitudinal axis Z of the beam 1, while the beam 1 is oscillated, the Coriolis force sinusoidally varying at an oscillation frequency is generated in the direction perpendicular to the drive surface 1a of the beam 1. This Coriolis force generates an oscillation having the same frequency as the drive frequency of the beam 1. The oscillation caused to the beam 1 by the Coriolis force is detected by the readout piezoelectric transducer 2b attached to the surface 1b perpendicular to the drive surface 1a of the beam 1. The detected signal is sent to a readout circuit (not shown).

A feedback piezoelectric transducer 2c to be used for exciting the beam 1 at a mechanical resonance frequency while its amplitude is kept to a certain length, is attached to a central portion of another longitudinal surface 1c of the beam 1 on the reverse side of the drive surface 1a in parallel therewith, and a damper piezoelectric transducer 2d is attached to a central portion of still another longitudinal surface 1d of the beam 1 on the reverse side of the surface 1b in parallel therewith.

In a conventional oscillatory angular speed detecting apparatus having the detector element described above with reference to FIG. 1, a signal amplitude-modulated at an angular speed, which is detected by the readout transducer is amplified, and then the amplified signal is demodulated. Next, the demodulated signal is rectified, thereby obtaining a direct-current signal having a strength in proportion to the input angular speed.

As described above, in the conventional angular speed detecting apparatus, the angular speed is detected by the strength of the direct-current signal which is obtained by demodulating the detection signal modulated in proportion to the angular speed, and a complicated signal processing is required in order to detect the direction of the input angular speed. Accordingly, its circuit structure becomes complicated.

In order to resolve this problem, the present applicant has proposed an oscillatory angular speed detecting apparatus. In this case, the angular speed is detected, not by using the amplitude variating corresponding to the angular speed, but by utilizing the phase which varies simultaneously with the amplitude and which is hardly varied by disturbances such as a voltage and a temperature variation, and a positive or negative signal is adapted to be readily output depending on a lag or lead of the phase against a reference phase by the phase-comparison, with the result that the detection of the angular speed direction can be readily carried out, as disclosed in the Japanese Patent Laid-Open Specification No. 61-193019. However, in this embodiment, an output having a sufficiently high level could not be obtained.

SUMMARY OF THE INVENTION

Accordingly, it is an object of the present invention to provide an oscillatory angular detecting apparatus which is capable of detecting an angular speed in a simple manner without a complicated signal processing, and of obtaining a sufficiently large output, and which can highly improve an ability of an angular speed detection.

In accordance with one aspect of the invention there is provided an oscillatory angular speed detecting apparatus, comprising a pillar-shaped oscillator body, a drive piezoelectric transducer mounted to a first side surface of the oscillator body, to which a drive signal for driving the oscillator body is applied, a readout piezoelectric transducer mounted to a second side surface substantially perpendicular to the first side surface the oscillator body to output a first readout signal when no rotational force is added to the oscillator body and a second readout signal when a rotational force is added to the oscillator body, phase detecting means which conducts a comparison of the first and second readout signals with the drive signal to obtain first and second compared readout signals and a comparison between phases of the first and second compared readout signals to obtain a first DC angular signal having a voltage level, and means for obtaining a strength and a direction of an angular speed from the voltage level of the first DC angular signal.

In accordance with another aspect of the invention there is provided an oscillatory angular speed detecting apparatus, comprising a pillar-shaped oscillator body, a drive piezoelectric transducer attached to a first side surface of the oscillator body, to which a drive signal for driving the oscillator body is applied, a readout piezoelectric transducer attached to a second side surface substantially perpendicular to the first side surface of the oscillator body to output a first readout signal when no rotational force is added to the oscillator body and a second readout signal when a rotational force is added to the oscillator body, amplitude detecting means which conducts a comparison between amplitudes of the first and second readout signals to obtain a second DC angular signal having a voltage level, and means for obtaining a strength and a direction of an angular speed from the voltage level of the second DC angular signal.

In accordance with still another aspect of the invention there is provided an oscillatory angular speed detecting apparatus, comprising a pillar-shaped oscillator body, a drive piezoelectric transducer mounted to a first side surface of the oscillator body, to which a drive signal for driving the oscillator body is applied, a readout piezoelectric transducer mounted to a second side surface substantially perpendicular to the first side surface of the oscillator body to output a first readout signal when no rotational force is added to the oscillator body and a second readout signal when a rotational force is added to the oscillator body, phase detecting means which conducts a comparison of the first and second readout signals with the drive signal to obtain first and second compared readout signals and a comparison between phases of the first and second compared readout signals to obtain a first DC angular signal having a voltage level, amplitude detecting means which conducts a comparison between amplitudes of the first and second readout signals to obtain a second DC angular signal having a voltage level, and means for obtaining a strength and a direction of an angular speed from the voltage levels of the first and second DC angular signals.

BRIEF DESCRIPTION OF THE DRAWINGS

The above and other objects, features and advantages of the present invention will more fully appear from the following description of the preferred embodiment with reference to the accompanying drawings, in which.

DETAILED DESCRIPTION OF THE PREFERRED EMBODIMENTS

The present invention will now be described in detail with reference to the preferred embodiment thereof, taken in connection with the accompanying drawings.

Figure 2:
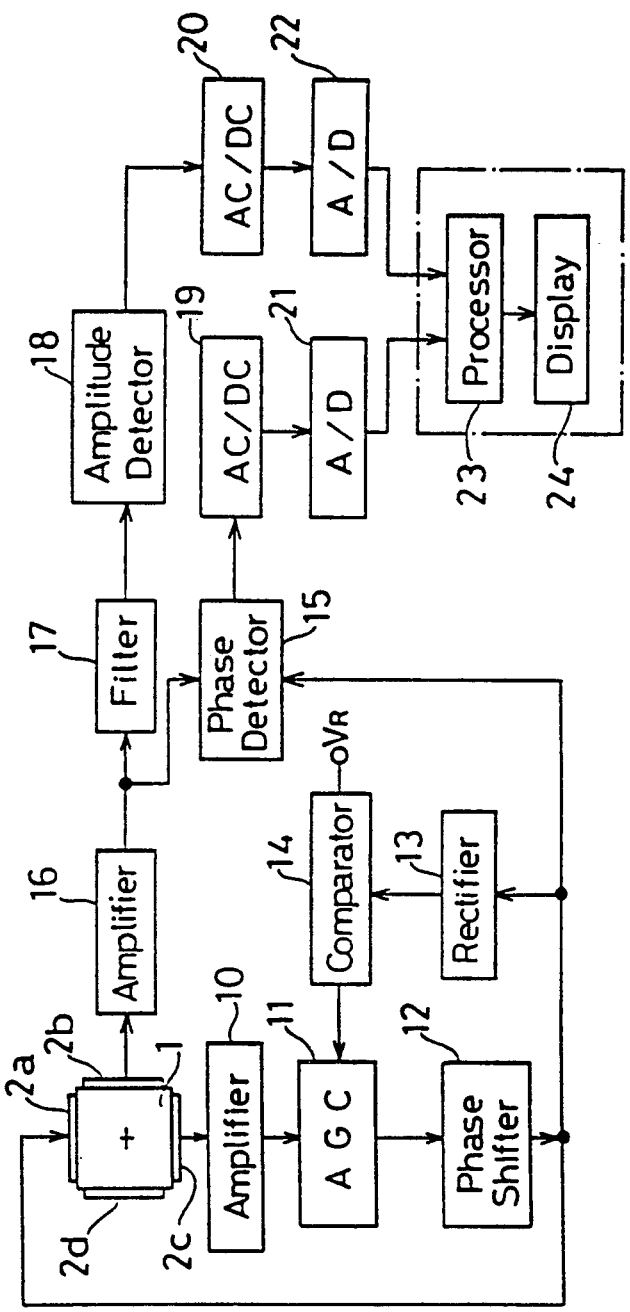
FIG. 2 is a block diagram of an oscillatory angular speed detecting apparatus according to the present invention.

Referring now to the drawings, wherein like reference characters designate like or corresponding parts throughout the several views, there is shown in FIG. 2 an oscillatory angular speed detecting apparatus according to the present invention.

Figure 1:
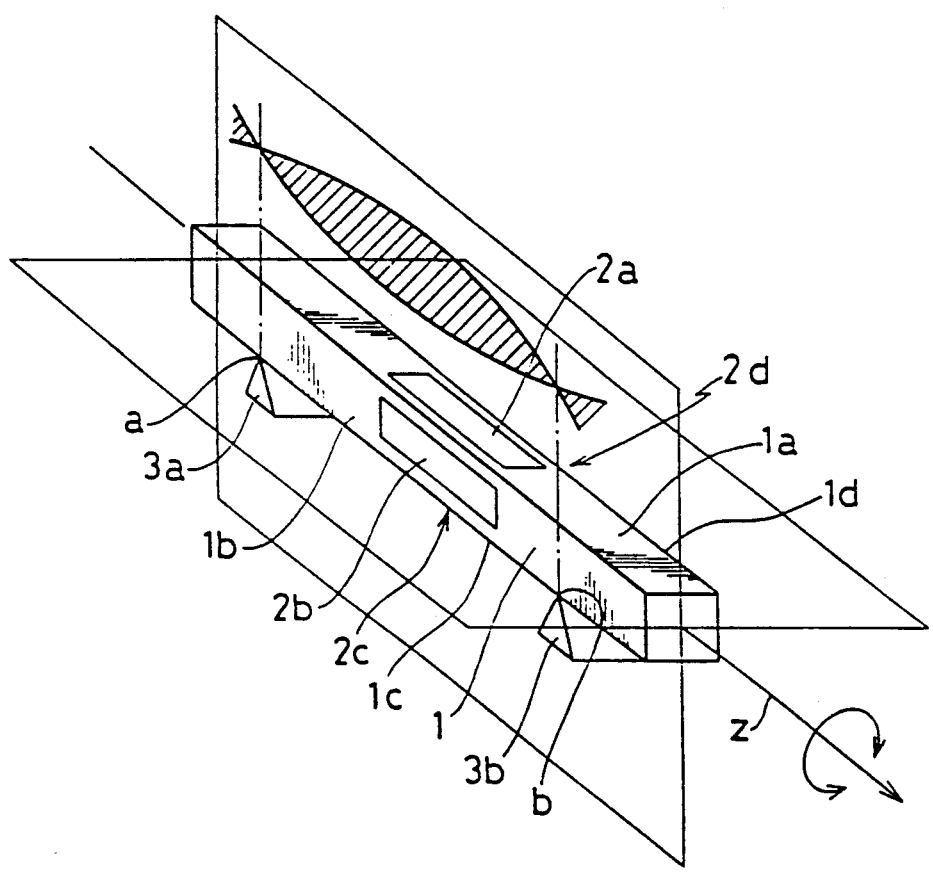
FIG. 1 is a perspective view of a conventional detector element to be used in an apparatus of FIG. 2.

In FIG. 1, the drive piezoelectric transducer 2a and the feedback piezoelectric transducer 2c are so attached to the beam 1 that polarities of their piezoelectric elements may be reversed, and consequently, when the drive signal is applied to the drive piezoelectric transducer 2a, a feedback signal with a phase leading 90° as compared with that of the drive signal is output from the feedback piezoelectric transducer 2c.

The feedback signal is fed to an amplifier 10 for amplifying the feedback signal, and then the amplified feedback signal is supplied to an automatic gain controller 11, hereinafter referred to as AGC, in which the level of the amplified feedback signal is maintained at a predetermined value. A stabilized feedback signal output from the AGC 11 is sent to a phase shifter 12 for shifting the phase of the stabilized feedback signal.

A phase-shifted feedback signal output from the phase shifter 12 is applied as the drive signal to the drive piezoelectric transducer 2a and is also fed to a rectifier 13. The rectified feedback signal is supplied from the rectifier 13 to one input of a comparator 14. In the comparator 14, the rectified feedback signal is compared with a reference voltage $V_R$ applied to another input of the comparator 14, and a compared result is output from the comparator 14 to the AGC 11 in order to control the gain of the AGC 11. Accordingly, the AGC 11 can output the stabilized feedback signal whose level is maintained at a certain level corresponding to the reference voltage $V_R$, and hence the drive of the beam 1 driven by the drive piezoelectric transducer 2a can be stably conducted always at a certain amplitude. The phase-shifted feedback signal is also applied as a reference phase signal from the phase shifter 12 to one input of a phase detector 15.

The readout signal output from the readout piezoelectric transducer 2b is fed to an amplifier 16 for amplifying the readout signal. An amplified readout signal is sent from the amplifier 16 to a filter 17 for eliminating unnecessary components of the amplified readout signal, and a filtered readout signal is fed to an amplitude detector 18 which detects an amplitude of the filtered readout signal and outputs an alternating current (AC) signal corresponding to the amplitude of the readout signal.

The amplified readout signal output from the amplifier 16 is also applied to another input of the phase detector 15 which compares the phase of the readout signal fed from the amplifier 16 with the phase of the reference phase signal supplied from the phase shifter 12 and outputs an alternating current (AC) signal corresponding to the phase shift between the readout signal and the reference phase signal and to the direction of the phase shift.

The AC signals output from the phase detector 15 and the amplitude detector 18 are fed to alternating current-direct current, hereinafter referred to as AC/DC. converters 19 and 20, respectively, in which the AC signals are converted into direct current (DC) signals, and then the two DC signals are sent to respective analog-digital, hereinafter referred to as A/D, converters 21 and 22 for converting analog signals into digital signals. The obtained digital signals are sent from the A/D converters 21 and 22 to a signal processor 23 comprising, for instance, a microcomputer, in which the digital signals are processed and the processing results are displayed on a display 24.

Figure 3:
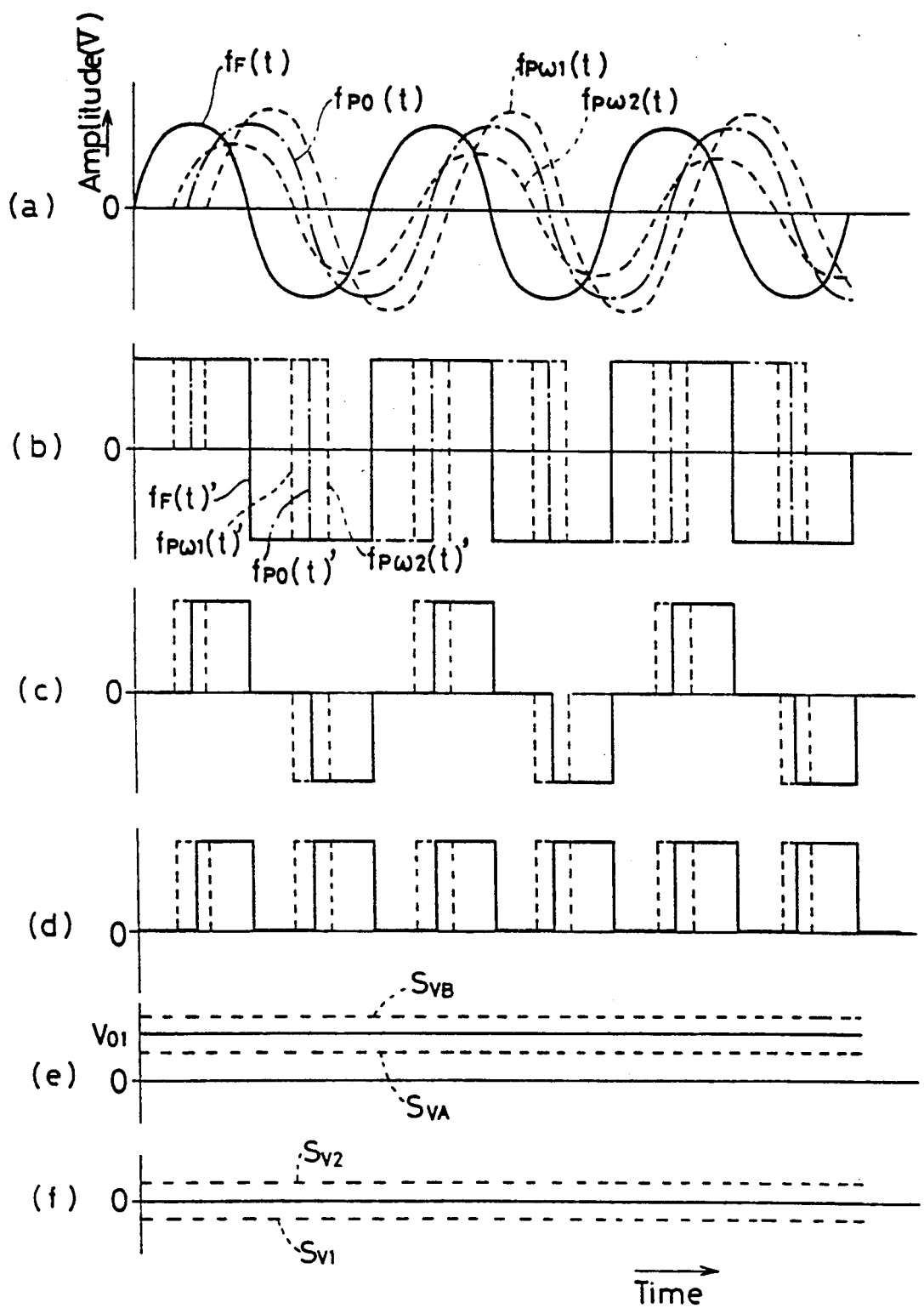
FIGS. 3 and 4 are wave form charts for explaining an operation of the apparatus of FIG. 2.
Figure 4:
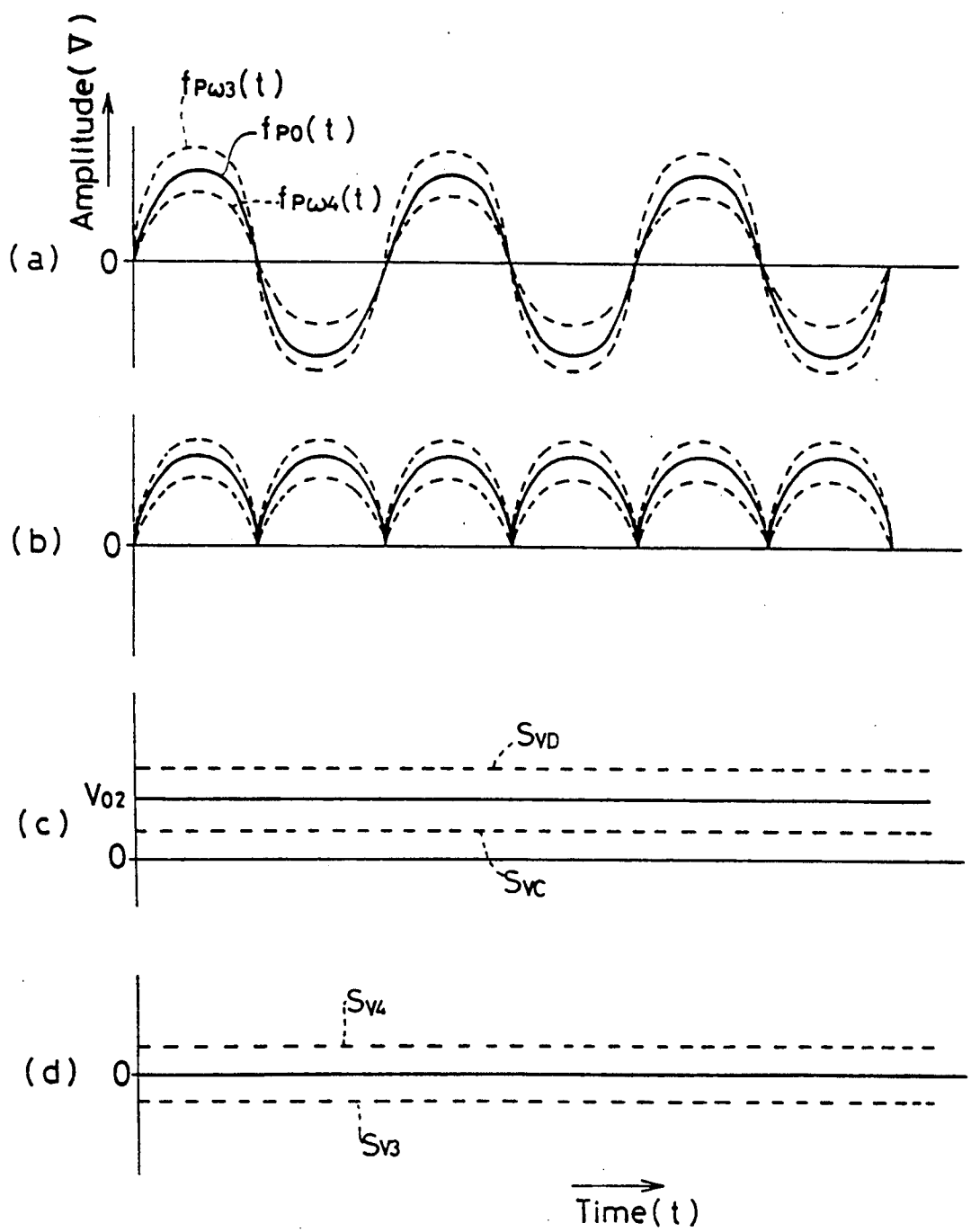

The operation of the above described oscillatory angular speed detecting apparatus according to the present invention will now be described in detail with reference to FIGS. 3 and 4.

Firstly, a method for detecting the angular speed from the phase of the readout signal will be described. A wave form $f_F(t)$ of the drive signal to be applied to the drive piezoelectric transducer 2a is indicated by a solid line of FIG. 3a, and the drive piezoelectric transducer 2a drives the beam 1 in response to the drive signal and causes the beam 1 to oscillate corresponding to the wave form of the drive signal. The oscillation of the beam 1 is stabilized by the AGC 11. A wave form $f_{p0}(t)$ indicated by a one-dotted line of FIG. 3a is an oscillatory wave form of the readout signal read out of the readout piezoelectric transducer 2b when no rotational force is added to the beam 1. As apparent from the comparison between these two wave forms, the phase of the readout signal is shifted 90° from that of the drive signal.

Now, when a rotational force is added to the beam 1 in the clockwise direction and an angular speed $\omega_1$ is input to the beam 1, the readout piezoelectric transducer 2b outputs a readout signal having a wave form $f_{p\omega 1}(t)$ indicated by a broken line of FIG. 3a. On the other hand, when a rotational force is added to the beam 1 in the counterclockwise direction and an angular speed $\omega_2$ is input to the beam 1, the phase of the readout signal is shifted in the reverse direction to that of the clockwise rotation, and the readout piezoelectric transducer 2b outputs a readout signal having a wave form $f_{p\omega 2}(t)$ indicated by another broken line of FIG. 3a.

The drive signal $f_F(t)$ and the three readout signals $f_{p0}(t)$, $f_{p\omega 1}(t)$ and $f_{p\omega 2}(t)$ are fed to the phase detector 15 where these waves are shaped to rectangular wave forms of signals $f_F(t)'$, $f_{p0}(t)'$, $f_{p\omega 1}(t)'$ and $f_{p\omega 2}(t)$, respectively, as shown in FIG. 3b. Then, the rectangular wave signal $f_F(t)'$ is compared with each of the rectangular wave signals $f_{p0}(t)'$, $f_{p\omega 1}(t)'$ and $f_{p\omega 2}(t)'$ and the same polarity portions of each pair of the rectangular wave signals are picked up, with the result that the phase detector 15 outputs three compared rectangular wave signals shown in FIG. 3c. In FIG. 3c, the wave signal indicated by a solid line is obtained from the two wave signals $f_F(t)'$ and $f_{p0}(t)'$ and each of the other wave signals indicated by broken lines is obtained from the two wave signals $f_F(t)'$ and $f_{p\omega 1}(t)'$, or $f_F(t)'$ and $f_{p\omega 2}(t)'$. It is readily understood from FIG. 3c that the continuous times of the positive and negative levels of each of the rectangular wave signals as to when the rotational forces are added, increase or decrease from those of the rectangular wave signal as to when no rotational force is added.

The rectangular wave signals shown in FIG. 3c are fed to the AC/DC converter 19 in which AC/DC conversion, offset processing and amplification of signals are carried out according to the following formula, $$V_{XF} = \left< V_X - \left( \frac{V_B - V_A}{2} + V_A \right) \right> X \left< \frac{2V_1}{V_B - V_A} \right> \quad \text{Equation 1-1A}$$

$$V_{XF} = \left< V_X - \left( \frac{V_B - V_A}{2} + V_A \right) \right> X \left< \frac{2V_2}{V_B - V_A} \right> \quad \text{Equation 1-1B}$$

where:

$V_X$ = An output from a sensor shown in the below-mentioned FIG. 1 (i.e., an output from a sensor when a certain angular velocity is inputted to this sensor, namely an original sensor output which has not yet been processed in accordance with the inventive angular velocity detecting apparatus).

$V_A$ = An output from the sensor when a rotational angular velocity with a negative full-scale value is given to this sensor.

$V_B$ = Another output from the sensor when a rotational angular velocity with a positive full-scale value is given to this sensor.

$V_1$ = A positive voltage value at a full scale condition (for instance, when this positive full-scale voltage is selected to be +5V, $V_1$ is equal to +5V).

$V_2$ = A negative voltage value at a full scale condition (for instance, when this negative full-scale voltage is selected to be −5V, $V_2$ is equal to −5V).

$V_{XF}$ = An output from the sensor which has been processed based on Equations 1-1 and 1-1B, namely desirable sensor output. That is, in the AC/DC converter 19, the full-wave rectification of the rectangular wave signals are performed to obtain signals having wave forms, as shown in FIG. 3d, and then the full-wave rectified signals are smoothed to obtain DC signals $S_{VA}$ and $S_{VB}$ having respective voltage levels $V_A$ and $V_B$, as shown in FIG. 3e wherein $V_{01}$ represents a level of a DC signal as to when no rotational force is added. Then, the smoothed DC signals $S_{VA}$ and $S_{VB}$ are so converted into other DC signals $S_{V1}$ and $S_{V2}$ having respective voltage levels $V_1$ and $V_2$, as shown in FIG. 3f that the level $V_{01}$ of the DC signal is offset or changed to the nought level, and the converted DC signals $S_{V1}$ and $S_{V2}$ shown in FIG. 3f are output from the AC/DC converter 19. In FIG. 3f, there are shown two DC signals $S_{V1}$ and $S_{V2}$ as to when the rotational force is added to the beam 1 in the clockwise or counterclockwise direction, respectively.

The DC signals $S_{V1}$ and $S_{V2}$ are fed to the processor 23 through the A/D converter where the DC signals $S_{V1}$ and $S_{V2}$ are converted into digital signals. In the processor 23, the angular speeds $\omega_1$ and $\omega_2$ are obtained from the DC signals $S_{V1}$ and $S_{V2}$ according to the following formula:

$$\omega_X = V_{XF}\left( \frac{|+\omega_F|}{|V_1|} \right) \quad \text{Equation 1-2A}$$

$$\omega_X = V_{XF}\left( \frac{|-\omega_F|}{|V_1|} \right) \quad \text{Equation 1-2B}$$

$$\omega_X = V_{XF}\left( \frac{|+\omega_F|}{|V_2|} \right) \quad \text{Equation 1-2C}$$

$$\omega_X = V_{XF}\left( \frac{|-\omega_F|}{|V_2|} \right) \quad \text{Equation 1-2D}$$

where:

$\omega_X$ = A desirable angular velocity, and $+$ and $-\omega_F$ = An angular velocity at either a positive full-scale condition, or a negative full-scale condition. In the processor 23, the directions of the angular speeds are also obtained from the polarities of the output signals of the A/D converter 21. The obtained angular speeds and the directions thereof are sent to the display 24 and are displayed thereon.

Secondly, the angular speed is obtained from the phase of the readout signal in the same manner as the first method described above, except that the AC/DC conversion of the signals is carried out in the AC/DC converter 19, and the offset processing and amplification of the signals are carried out in the same manner as the first method described above in the processor 23. That is, in this embodiment, the calculations of the formulas 1-1 and 1-2 are carried out in the same time in the processor 23, thereby obtaining the angular speed $\omega$.

Thirdly, a method for detecting the angular speed from the amplitude of the readout signal will be described. There are shown in FIG. 4a three wave forms $f_{p0}(t)$, $f_{p\omega3}(t)$ and $f_{p\omega4}(t)$ of the readout signals, as indicated by a solid line and two broken lines, when no rotational force is added to the beam 1, when a rotational force is added to the beam 1 in the clockwise direction, and when a rotational force is added to the beam 1 in the counterclockwise direction, respectively. In this case, since it is unnecessary to consider the differences of the phases of these signals in detecting the amplitudes, the three wave forms are shown in the same phase, as shown in FIG. 4a, for reasons of convenience. However, in fact, the phases of the signals are often different from one another, as shown in FIG. 3a. Further, the amplitude variations of the signals are not always fixed to $f_{p\omega3}(t) > f_{p0}(t) > f_{p\omega4}(t)$, as shown in FIG. 4a, and vice versa. The amplitudes of the wave forms $f_{p\omega3}(t)$ and $f_{p\omega4}(t)$ may be larger or smaller than that of the wave form $f_{p0}(t)$.

The readout signals having the wave forms shown in FIG. 4a are fed from the readout piezoelectric transducer 2b to the amplitude detector 18 for detecting the amplitudes of the readout signals via the amplifier 16 and the filter 17, and then the readout signals are sent from the amplitude detector 18 to the AC/DC converter 20 having the same functions as those of the AC/DC converter 21 described above. In the AC/DC converter 20, the same signal processing as that in the AC/DC converter 19 is carried out.

That is, in the AC/DC converter 20, the full-wave rectifications of the signals are carried out, thereby obtaining rectified signals shown in FIG. 4b. Then, the rectified signals are flattened to obtained DC signals $S_{VC}$ and $S_{VD}$ having respective voltage levels $V_C$ and $V_D$, as shown in FIG. 4c. Next, the flattened DC signals $S_{VC}$ and $S_{VD}$ are so converted into other DC signals $S_{V3}$ and $S_{V4}$ having respective voltage levels $V_3$ and $V_4$, as shown in FIG. 3d that the level $V_{02}$ of the DC signal as to when no rotational force is added, is offset or changed to the nought level. In FIG. 4d, there are shown two DC signals $S_{V3}$ and $S_{V4}$ as to when the rotational forces are added to the beam 1 in the clockwise and the counterclockwise directions, respectively. The converted DC signals $S_{V3}$ and $S_{V4}$ are output from the AC/DC converter 20 to the processor 23 through the A/D converter 22 where the DC signals are converted into digital signals. The angular speed and the direction thereof can be obtained in accordance with formulas 1-1 and 1-2 in the same manner as the first method described above in the processor 23.

Fourthly, the angular speed can be obtained from the amplitude of the readout signals in the same manner as the third method described above except with the reference to the second method described above. That is, the offset processing and amplification of the signals and the angular speed detection are carried out in the same time in the processor 23.

Fifthly, the angular speed is obtained from the phase of the readout signal in a similar manner to the first method described above, except that the AC/DC conversion of the signals is carried out in the AC/DC converter 19 to obtain the DC signals $S_{VA}$ and $S_{VB}$ having the respective voltage levels $V_A$ and $V_B$, and the processor 23 is provided with a table map in which voltage values $V\omega$ directly corresponding to angular speeds $\omega$ and to the voltage levels of the smoothed DC signals $S_{VA}$ and $S_{VB}$ output by the AC/DC converter 19, as shown in FIG. 3e, are stored, and by accessing in the table map by means of the smoothed DC signal $S_{VA}$ or $S_{VB}$, the corresponding voltage value $V\omega$ or angular speed $\omega$ can be directly obtained. In this embodiment, since the voltage values $V\omega$ directly corresponding to the angular speeds $\omega$ are calculated and are stored in the table map in advance, a one-dimensional or two-dimensional characteristics curve with respect to the voltage levels of the smoothed DC signals can be readily and precisely prepared, and thus the angular speed can be quickly obtained with high accuracy.

Sixthly, the angular speed is obtained from the amplitude of the readout signal in a similar manner to the third method described above, except that the AC/DC conversion of the signals is carried out in the AC/DC converter 20 to obtain the DC signals $S_{VC}$ and $S_{VD}$ having the respective voltage levels $V_C$ and $V_D$, and the processor is provided with a table map in which voltage values $V\omega$ directly corresponding to angular speeds $\omega$ and to the voltage levels of the smoothed DC signals $S_{VC}$ and $S_{VD}$ output by the AC/DC converter 20, as shown in FIG. 4c, are stored, and by accessing in the table map by means of the smoothed DC signal $S_{VC}$ or $S_{VD}$, the corresponding voltage value $V\omega$ or angular speed $\omega$ can be directly obtained, with the result of the same effects and advantages as those of the fifth method.

Seventhly, the angular speed is obtained from the combination of the phase and amplitude of the readout signal in connection with one example, as shown in Table 1, as follows. For instance, the angular speeds $\omega$ are divided into five ranges $R_1$, $R_2$, $R_3$, $R_4$ and $R_5$ by $-70$ (degree/sec), $-10$, $+10$ and $+70$, and four threshold voltages $-V_{TH2}$, $-V_{TH1}$, $+V_{TH1}$ and $+V_{TH2}$ corresponding to the angular speeds $-70$, $-10$, $+10$ and $-70$ are determined. Four output voltages $-V_{p2}$, $-V_{p1}$, $+V_{p1}$ and $+V_{p2}$ of the AC/DC converter 19 and four output voltages $-V_{A2}$, $-V_{A1}$, $+V_{A1}$ and $+V_{A2}$ of the AC/DC converter 20, the both values also corresponding to the angular speeds $-70$, $-10$, $+10$ and $+70$, are determined. Of course, these values are one example and the present invention is not restricted to this example. Of course, the angular speeds for defining the angular speed ranges can be varied, as occasion demands.

In this embodiment, the processing for obtaining the angular speed is somewhat modified as compared with those of the first to sixth methods described above by the fact that the voltage levels $V_P$ and $V_A$ of the DC signals output by the AC/DC converters 19 and 20, as shown in FIGS. 3f and 4d, fall within one of the five ranges $R_1$ to $R_5$. That is, when the voltage levels $V_P$ and $V_A$ of the DC signals output by the AC/DC converters 19 and 20 are included in the range $R_3$, the ranges $R_1$ and $R_5$ or the ranges $R_2$ and $R_4$, the angular speed can be output by the phase as the main measures, the amplitude can be output as the main measures or the phase and amplitude can be output as the equal measures, respectively, i.e., by varying factors to be multiplied to the voltage levels $V_{\omega P}$ and $V_{\omega A}'$ directly corresponding to the angular speeds, as hereinafter described in detail.

Now assuming that $f_1$ and $f_2$ ($1 \geq f_1 >> f_2$; $f_1+f_2=1$) are factors to be multiplied by the respective voltages $V_{\omega P}$ and $V_{\omega A}$ directly corresponding to the respective angular speeds, which can be obtained in the respective phase and amplitude detections in the processor 23 as described above; when $V_P \leq |V_{TH1}|$ and $V_A \leq |V_{TH1}|$, $f_3$ and $f_4$ ($1 > f_3 \approx f_4$; $f_3+f_4=1$) are factors to be multiplied by the respective voltages $V_{\omega P}$ and $V_{\omega A}$ when $|V_{TH1}| < V_P < |V_{TH2}|$ and $|V_{TH1}| < V_A < |V_{TH2}|$, and $f_5$ and $f_6$ ($f_5 < f_6 \leq 1$; $f_5 + f_6 = 1$) are factors to be multiplied by the respective voltages $V_{\omega P}$ and $V_{\omega A}$ when $V_P \geq |V_{TH2}|$ and $V_A \geq |V_{TH2}|$.

TABLE 1

| Angular Speed (Degree/Sec) | −70 | −10 | | +10 | +70 |
|---|---|---|---|---|---|
| Angular Speed Range | $R_1$ | $R_2$ | $R_3$ | $R_4$ | $R_5$ |
| Processing | Mainly Amp. | Phase & Amp. | Mainly Phase | Phase & Amp. | Mainly Amp. |
| Threshold Voltage (Phase) | $-V_{TH2}$ | $-V_{TH1}$ | 0 | $+V_{TH1}$ | $+V_{TH2}$ |
| Output Voltage of AC/DC 19 | $-V_{P2}$ | $-V_{P1}$ | | $+V_{P1}$ | $+V_{P2}$ |
| (Amplitude) Output Voltage of AC/DC 20 | $-V_{A2}$ | $-V_{A1}$ | | $+V_{A1}$ | $+V_{A2}$ |

Figure 5:
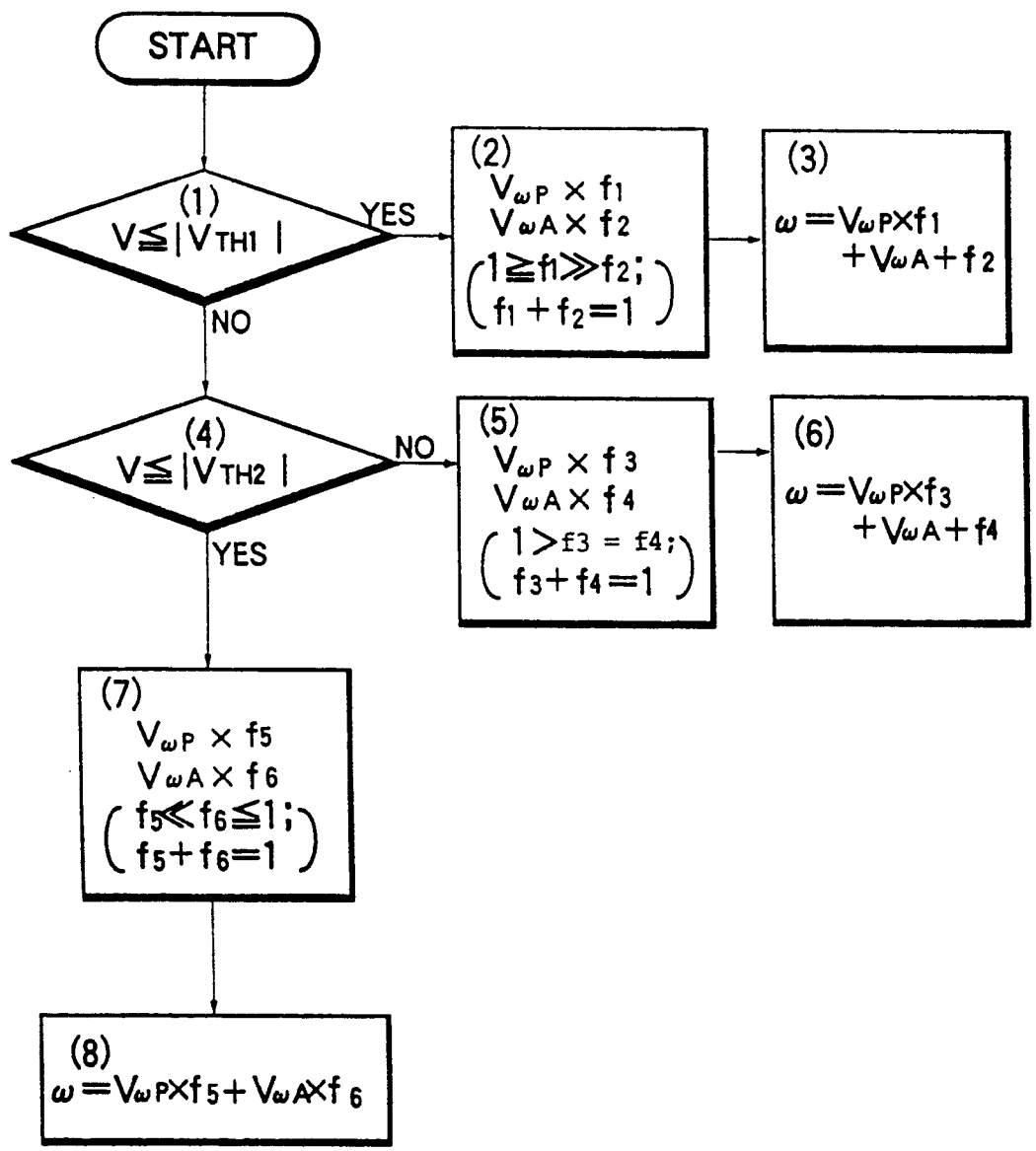
FIG. 5 is a flow chart for explaining a seventh method for obtaining the angular speed according to the present invention.

One example for obtaining the angular speed ω in the processor 23 will be described in connection with FIG. 5 and Table 1 as follows. when $-V_{P1} \leq V_P \leq +V_{P1}$ and $-V_{A1} \leq V_A \leq +V_{A1}$ in the range $R_3$, the processing of (2) and (3) in FIG. 5 is carried out to obtain the angular speed $\omega = V_{\omega P} \times f_1 + V_{\omega A} \times f_2$.

When $-V_{P2} < V_P < -V_{P1}$ or $+V_{P1} < V_P < +V_{P2}$ and $-V_{A2} < V_A < -V_{A1}$ or $+V_{A1} < V_A < +V_{A2}$ in the range $R_2$ or $R_4$, the processing of (5) and (6) in FIG. 5 is carried out to obtain the angular speed $\omega = V_{\omega P} \times f_3 + V_{\omega A} \times f_4$.

When $V_P \leq -V_{P2}$ or $V_P \geq +V_{P2}$ and $V_A \leq -V_{A2}$ or $V_A \geq +V_{A2}$ in the range $R_1$ or $R_5$, the processing of (7) and (8) in FIG. 5 is carried out to obtain the angular speed $\omega = V_{\omega P} \times f_5 + V_{\omega A} \times F_6$.

In this embodiment, when $V_P$ is not included in the same range as that of $V_A$ in a boundary region, the angular speeds are obtained in the same manner as described above. In this embodiment, the angular speeds can be obtained with higher accuracy.

It is readily understood from the above description of the preferred embodiments, that according to the present invention, since the angular speeds are detected from the phases and amplitudes of the readout signals readout of the readout piezoelectric transducer attached to the oscillator body, the large signals representing the strengths of the angular speeds can be obtained, and the detection of the angular speeds can be highly improved. Further, according to the present invention, the directions of the angular speeds may be detected from the phases in a simple manner without requiring a complicated signal processing.

Although the present invention has been described in its preferred embodiments with reference to the accompanying drawings, however, it is readily understood that the various changes and modifications of the present invention may be made by a person skilled in the art without departing from the spirit and scope of the present invention.

What is claimed is:

1. An oscillatory angular velocity detecting apparatus, comprising:
   a pillar-shaped oscillator body;
   means for applying a drive signal to a transducer mounted to a first side surface of the oscillator body, said transducer comprising means for applying a driving force to said oscillator body;
   means, mounted to a second side surface substantially perpendicular to the first side surface of the oscillator body, i) for producing a first readout signal when no rotational force is added to the oscillator body and ii) for producing a second readout signal when a rotational force is added to the oscillator body;
   phase detecting means, i) for a first comparison of the respective first and second readout signals with the drive signal to obtain first and second compared readout signals, and ii) for a second comparison between the respective phases of the first and second compared readout signals to obtain a first DC angular signal having a voltage level;
   means for conducting amplitude detection by comparison between amplitudes of the first readout signal and the second readout signal to obtain a second DC angular signal having a voltage level; and
   means for deriving a strength value and a direction value, respectively, of angular velocity from the voltage level of the first DC angular signal.

2. The oscillatory angular velocity detecting apparatus of claim 1, wherein the phase detecting means includes:
   means for shaping the drive signal and the first and second readout signals to rectangular wave forms to obtain a rectangular drive signal analog and first and second rectangular readout signal analogs, respectively;
   means for extracting same polarity portions of the rectangular drive signal analog and the first rectangular readout signal analog and of the rectangular drive signal analog and the second rectangular readout signal analog to obtain first and second compared rectangular signals;
   means for full-wave rectification of the first and second compared rectangular signals to obtain first and second rectified rectangular signals; and
   means for smoothing the first and second rectified rectangular signals to obtain the first and second DC angular signals; and
   wherein the amplitude detecting means includes:
   means for full-wave rectification of the first and second readout signals to obtain third and fourth rectified signals and
   means for smoothing the third and fourth rectified signals to obtain the third and fourth DC angular signals; and
   means for detecting the strength and the direction of the angular velocity from the voltage levels of the first and second and third and fourth DC angular signals, respectively.

3. The oscillatory angular velocity detecting apparatus of claim 1, wherein the amplitude detecting means includes an amplitude detector and an AC/DC converter.

4. The oscillatory angular velocity detecting apparatus of claim 1, wherein said means for deriving includes a processor.

5. The oscillatory angular velocity detecting apparatus of claim 1, wherein the phase detecting means includes a phase detector, an AC/DC converter, and a processor.

6. The oscillatory angular velocity detecting apparatus of claim 1, wherein the processor includes means for storing the angular velocities to be accessed by the first DC angular signal, and said means for storing includes a memory table.

7. The oscillatory angular velocity detecting apparatus of claim 1, wherein the phase detecting means includes a phase detector, an AC/DC converter, and a processor.

8. The oscillatory angular velocity detecting apparatus of claim 1, wherein said means for applying a drive signal includes gain control means for maintaining a predetermined level of the drive signal to the transducer.

9. An oscillatory angular velocity detecting apparatus, comprising:

a pillar-shaped oscillator body;

means for applying a fixed-reference-voltage-stabilized drive signal to a piezoelectric transducer mounted to a first side surface of the oscillator body, said transducer comprising means for applying a driving force to said oscillator body;

means, mounted to a second side surface substantially perpendicular to the first side surface of the oscillator body, i) for producing a first readout signal when no rotational force is added to the oscillator body and ii) for producing a second readout signal when a rotational force is added to the oscillator body;

phase detecting means, i) for a first comparison of the respective first and second readout signals with the drive signal to obtain respective first and second compared readout signals, and ii) for a second comparison between the respective phases of the first and second compared readout signals to obtain a first DC angular signal having a voltage level;

means for conducting amplitude detection by comparison between amplitudes of the first readout signal and the second readout signal to obtain a second DC angular signal having a voltage level; and means for deriving a strength value and a direction value, respectively, of angular velocity from the voltage level of the first DC angular signal.

* * * * *